Sept. 22, 1953  H. R. DE VLIEG  2,652,634
PRESETTING DEVICE FOR CUTTING TOOLS
Filed Oct. 7, 1949  2 Sheets-Sheet 2

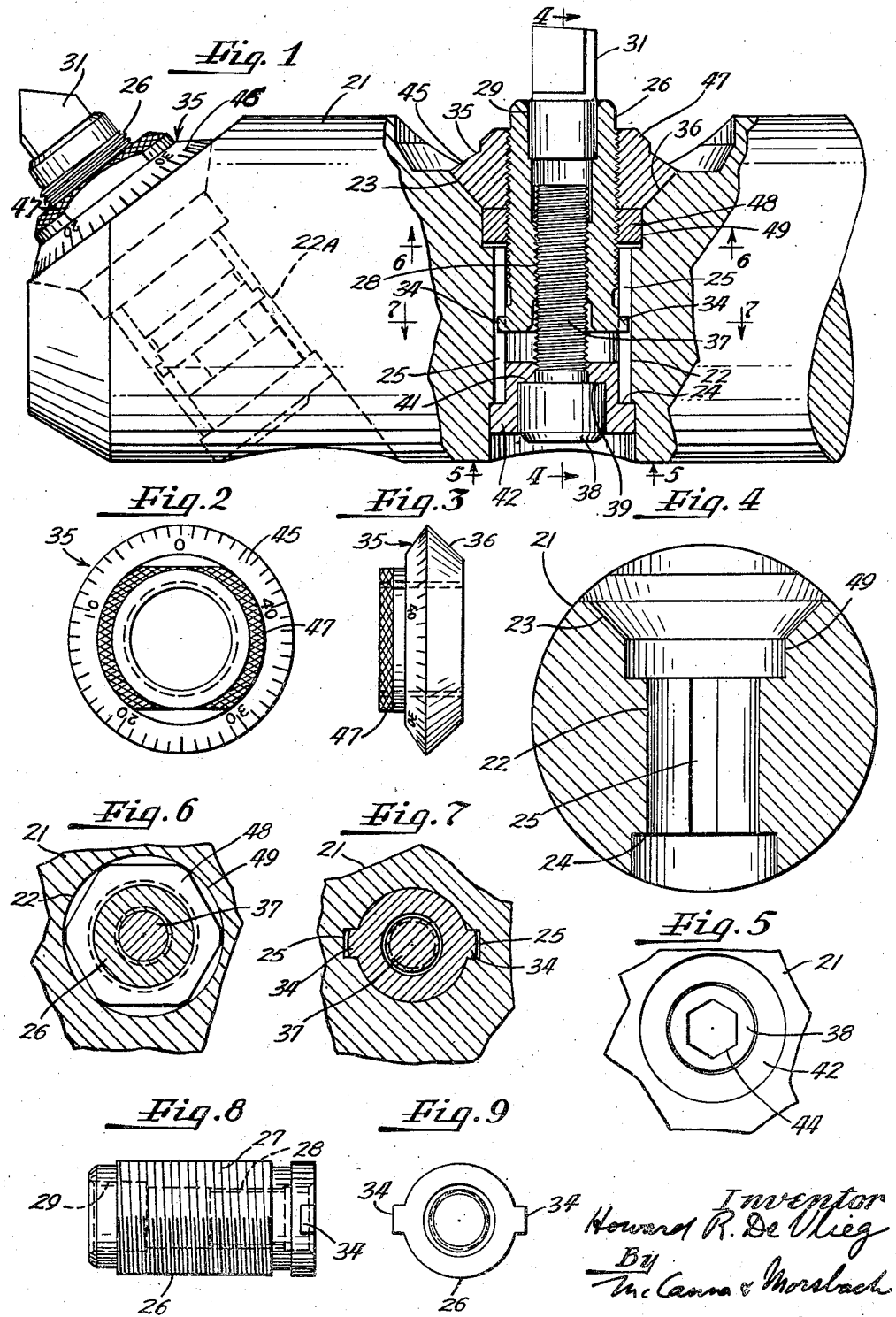

Inventor
Howard R. DeVlieg
By
McCanna & Morsbach
Attys.

Patented Sept. 22, 1953

2,652,634

UNITED STATES PATENT OFFICE 2,652,634

PRESETTING DEVICE FOR CUTTING TOOLS

Howard R. De Vlieg, Grosse Pointe Woods, Mich.

Application October 7, 1949, Serial No. 120,129

8 Claims. (Cl. 33—185)

1

This invention relates to cutting tools and has more particular reference to cutting tools of the kind disclosed in Patents Nos. 2,330,692 and 2,537,517, granted September 28, 1943 and January 9, 1951, respectively.

The present invention is a pre-setting device for the type and kind of cutting tools disclosed in said patents.

The primary object of this invention is to improve the utility of tools of this kind. In furtherance of this general object my invention provides novel means for pre-setting the cutter element in a manner to effect greater accuracy coupled with time saving in the setting and operation of these tools.

Another object of my invention is the provision of novel means whereby greater tool economy is obtained. In other words, with the use of my invention a material saving may be effected in the cost of tool equipment for many manufacturing jobs and operations.

Another object of my invention is the provision of novel means whereby higher production in machining operations is obtained, as will be explained more fully hereinafter.

Other objects and attendant advantages will be appreciated by those skilled in this art as the invention becomes better understood by reference to the following description when considered in connection with the accompanying drawings in which:

Figure 1 is a side view of a boring bar equipped with two cutter units to be pre-set by my invention, one such unit being shown in section;

Figures 2 and 3 are face and side views, respectively, of a dial type adjusting member removed from the unit;

Figure 4 is a section through the boring bar taken on the section line 4—4, of Figure 1, with the cutter unit removed;

Figure 10:
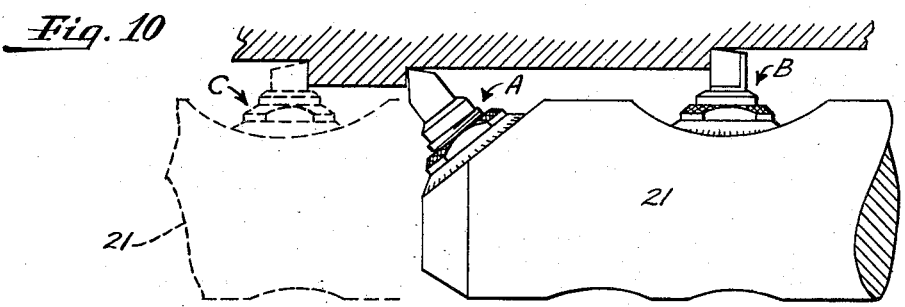
Figure 11:
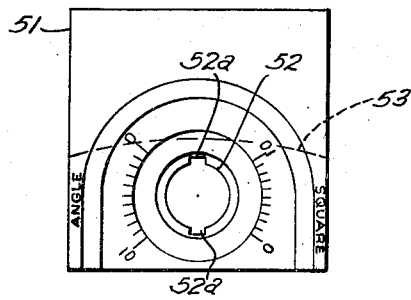
Figure 14:
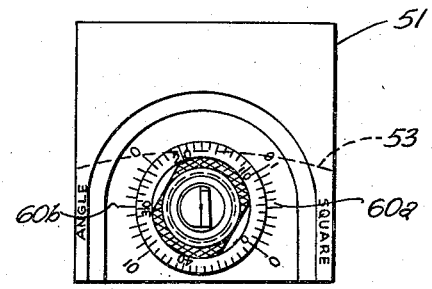
Figure 12:
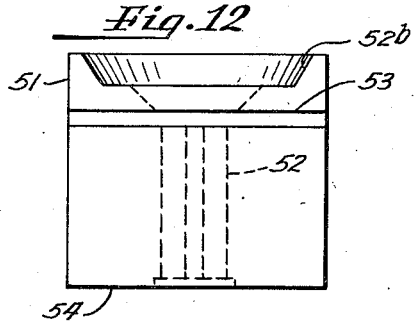
Figure 15:
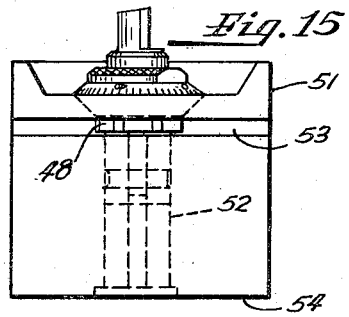
Figure 13:
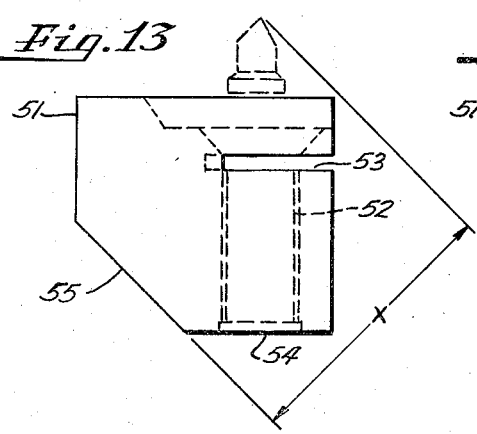
Figure 16:
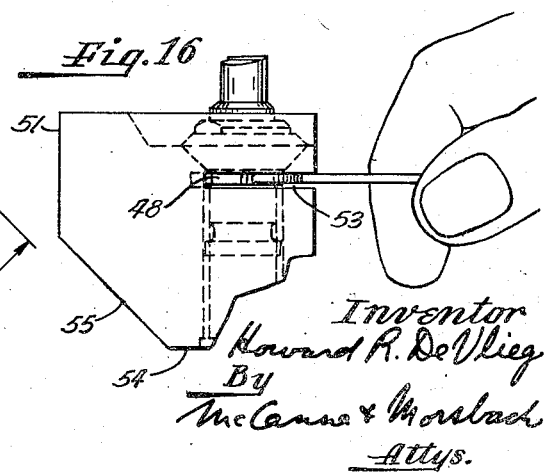

Figures 5, 6 and 7 are detail sections or views taken on the section lines 5—5, 6—6, and 7—7, respectively, of Figure 1;

Figures 8 and 9 are side and end views, respectively, of the cutter-carrying member;

Figure 10 shows one example of cutters pre-set by a typical use of the invention;

Figures 11, 12 and 13 are top, front and side views, respectively, of a supporting block used in setting or adjusting the cutter unit; and Figures 14, 15 and 16 are top, front and side views, respectively, of said supporting block together with the cutting unit, and showing in Figure 16 the application of a hand wrench to the intermediate clamping or locking means.

2

Referring to Figure 1, the tool holder designated generally by 21, in this instance a boring bar, is equipped with two individual cutting tools to be pre-set by my invention. Each such tool is identical in construction (except for the cutting point). The tool at the right is at an angle of 90° with respect to the axis of the boring bar and the tool at the left is at an angle of approximately 52° 8' with respect to said axis. The bar is provided with a through bore 22 for the first mentioned tool and a similar bore 22A for the second tool.

A description of the tool unit at the right will suffice as being typical of any of a variety of mountings. The bar is machined to provide a conical abutment surface 23 concentric with the bore at one end thereof. At the opposite end, the bar is machined to provide a thrust shoulder 24. In the preferred embodiment the bar is further machined to provide diametrically opposed key slots 25 extending lengthwise along the bore and intersecting the surface 24 and the bore 49 hereinafter described. A cutter cartridge body or housing designated generally by 26 is externally threaded from end to end of its major cylindrical portion 27 as best shown in Figure 8, and this portion has a sliding fit in the bore 22. The cartridge body has a central bore, the portion 28 of the bore being threaded and the portion 29 being of sufficient diameter and length to receive the shank end of a cutter element 31. The cutter element may also be integral with the cartridge body or it may be brazed or otherwise united directly thereto. As shown at the right in Figure 1, the cutter element has a close fit in the bore 29 and is brazed or otherwise suitably fixed therein so as to provide a rigid mounting equivalent to an integral structure. The cutter element 31 is preferably of tungsten carbide or other carbide steel or other suitable cutting material of which there are a number of makes well known on the market such as Stellite, diamonds, high speed steel and the like. The body 26 is provided opposite its cutter-carrying end with integral diametrically extending key elements 34 which fit in the grooves 25, thereby retaining the cartridge body against rotative movement at any position in the bore. On the cartridge body 26 is rotatably mounted a graduated dial or collar designated generally by 35. The dial is preferably threaded directly to the body 26. This dial is shaped to provide a conical base surface 36 at an angle complemental to the surface 23 so that when the cartridge body is drawn inwardly axially of the bore the cone base of the dial will by its coaction with the cone surface 23 be accurately centered with respect to the axis of the bore and the corresponding axis of the cutter cartridge body. Means for so moving the cartridge body comprises a locking screw 37 having a screw body of substantial length threaded in the bore 28 and having a socket head 38 the shoulder 39 of which is adapted to seat against a shoulder 41 of a thrust collar 42. Upon tightening the screw 37 it serves to clamp its shoulder 39 against the collar 42 and the latter against the end shoulder 24. This pulls the cartridge body lengthwise inwardly into the bore. When the screw 37 is tightened the cartridge body pulls the cone face of the dial against the cone surface 23, thereby centering the graduated dial and the cutting tool, as described. This tightening also forcibly clamps this dial against the base surface 23 and at the same time forcibly and rigidly clamps the cartridge body and its cutting element in the ultimate set position on the boring bar. The head 38 of the locking screw has a wrench socket 44 to receive a similarly shaped wrench or tool for tightening and locking the parts in the set position.

As shown in Figure 2, the dial face 45 is graduated from 0 to 50 in coaction with a 0 to 10 vernier graduation (not shown) on the face of the boring bar. Each dial graduation spacing indicates .001″. One revolution of the dial advances the tool cutter point .025″, giving a cut of .050″ measured diametrically. This is desirable for machine shop and tool making practices, but any suitable graduations may be used. A tool unit of the same kind may be applied in a different angular relation on the boring bar (as in the position at the left in Figure 1) without change except as to the graduations on the dial. Here the dial 46 is provided with graduations 0 to 40, and one revolution of the dial advances the tool cutter point .020″, each spacing on the dial indicating .001″ as in the case of the graduations on the dial 35. This result can be demonstrated mathematically, given the angular position of the cutter unit axis as approximately 52° 8′ with respect to the axis of the boring bar. This is particularly advantageous because the same cartridge parts and dials of the same construction can be used in different angular settings, the dials differing only in their respective graduations. Each dial is preferably shaped to provide a knurled portion 47 interrupted by flat faces to facilitate manipulating the dial when making settings.

The principal parts heretofore described are in general similar to the disclosure in said Patent No. 2,537,517, except for certain differences hereinafter noted.

Attention is now directed to the provision of a second locking member 48 threaded on the cutter-carrying body 26 and adapted to be rotatively moved thereon into clamping engagement with the inner end of the dial member 35 to thereby lock the dial member to the cutter-carrying body 26. By reverse movement of the member 48 the dial member is released so that it is free to be rotatively adjusted on cutter-carrying member 26. The tool or supporting body 21 is further bored at 49 to provide for location of the locking member 48 through the tapered dial opening. Thus each cutter cartridge unit comprising body 26, dial 35, and locking member 48, may be inserted into the bore in the body 21, through the taper surface end of such bore to seat the conical dial surface 36 on the corresponding surface 23 and thereby locate the cutter unit in its operating position prior to locking the cutter unit in position by means of the locking screw 37 as above described. When the locking screw 37 is released and removed the cutter cartridge unit may be removed from the body 21. It will be observed that this cutter unit may now be handled without disturbing the setting of the dial 35, with respect to its cutter-carrying body 26; this by reason of the locking effected by the member 48. This construction is provided for the purpose of pre-setting the cutter element of the cutter unit in accordance with the objects of the present invention. In making these settings I have provided a setting block designated generally by 51, shown in Figures 11 to 16 inclusive. The block is preferably provided with a bore 52 and diametrically opposed slots 52a similar to the above described bore 22 and slots 25 for receiving and mounting the cutter unit in the boring bar body 21. The bore 52 also includes a conical seating surface 52b similar to the conical abutment surface 23 already described. The block is further provided with a lateral slot 53 which intersects the bore 52, the slot 53 being coplanar with the portion of the bore corresponding with 49 above described. Thus the slot 53 provides access for an open end wrench or similar tool in the manner shown in Figure 16 for the purpose of loosening and tightening the locking member 48 when the cutter unit is seated in the block. The block serves as a supporting body for the cutter unit for making accurate adjustments or settings of the cutter element and this supporting body may be of any suitable construction. In the preferred embodiment of my invention this supporting body is in the form of a block as above mentioned and I provide the block with a flat base 54 and arrange the longitudinal center axis of the cutter unit mounting, that is, the bore configuration 52, perpendicular to the base. Thus the setting block may be used on a surface plate or any suitable flat surface for support such as is used in machine shops and tool rooms when taking measurements with instruments. In this case the measurement would be from the base line 54 to the point of the cutting element. In such supported position of the cutter unit on the setting block it will be apparent that the workman may make accurate micrometer adjustments and settings of the cutter element in its unit assembly, that is, with respect to the dial support. This will be done by first loosening the member 48 in the manner shown in Figure 16. This will not disturb the relation between the dial and the cutter element because the latter is retained against rotation by engagement of its keys 34 in the key ways in the block. Then the dial may be adjusted for the desired micrometer setting. In this case the graduations on the dial coact with 0 to 10 graduations on the face of the block as shown at the right in Figure 14 and designated by the reference numeral 66a. The latter graduations correspond with those above mentioned on the face of the boring bar in the assembly at the right in Figure 1. Since in this assembly the tool unit is at right angles to the longitudinal axis of the boring bar I have applied the term "square" on the block at the side adjacent to this 0 to 10 graduation. When the tool unit is to be used in an angular assembly or setting as shown at the left in Figure 1 a different dial setting would be required and for this purpose I have provided dial graduations 0 to 10 of a scale designated as 60b designed to accurately indicate the required dial adjustment for the cutter when in the angular position. This second graduation 0 to 10 is applied at the left side on the face of the block as shown in Figure 14 adjacent to the term "angle," a corresponding graduation being applied on the boring bar adjacent to the dial 46. In this manner a single block is provided for making dial settings for a cutter unit regardless of whether it is to be used in the "square" or the "angle" setting. It will be observed that with this construction the workman may make accurate micrometer adjustments and settings of the cutter element in its unit assembly and that these settings will, micrometrically, bear the same relation axially to the unit and its conical mounting surface 36 when seated on the block as it will bear to such unit when the unit is transferred to its working position in the boring bar or other tool support. However, before making such transfer the dial member 35 will be locked to its body member 26 by tightening the locking member 48 while the cutter unit assembly is in its adjusted position in the setting block. In making these adjustments and settings it is sometimes desired to take measurements from the base line 54 to the point or cutting edge of the cutter element. Such a measurement may obviously be taken when the block is seated on the base 54 for the "square" setting. In order to take such measurements for the "angle" setting I have provided an angle surface 55 on the block complemental to the angle setting shown at the left in Figure 1. It will be apparent that with the block surface 55 seated on a surface plate the measurement "X" may be taken to determine the setting of the tool point.

The advantages of this invention are many. For example, one boring bar may be used for many jobs by substituting or interchanging different cutter units of the kind described. This is illustrated in Figure 10 showing a boring bar 21 and cutter units A and B mounted thereon in a manner similar to the showing in Figure 1. Here the multiple cutters A and B perform what is known as counterboring from one side, as from right to left. Now, with the same boring bar the tool A may be removed and the tool B may be reset 180° in its mounting in position C to cut from left to right. In jobs of this kind where a high degree of precision is desired, very accurate settings may be made quickly and easily with the use of my invention.

Another example illustrating the advantage of my invention is in jobs where the operation is repeated, as in production runs. Here the tool wear usually requires replacement or resetting of the cutting unit at intervals, the frequency of which depends on the severity of the particular cutting operation. With my invention individual cutting units may be accurately pre-set in a tool room according to measurement requirements of the job. Thus the machine operator may remove a worn cutter unit and substitute a new unit with assurance that the new unit is properly set. This eliminates the tedious and time-taking operations by the machine operator in making careful and accurate measurements for each new cutter unit mounting. It also promotes greater accuracy. It also promotes higher productivity in the use of any given machine having cutting operations of this kind where the operations are repeated either in short run jobs or in the longer production jobs.

Another advantage of my invention is its use in shops where a job is repeated at intervals which might vary from a week to a month apart and between which intervals the machine tool is used for other purposes. Here, the tool units may be pre-set to a given specification so that they will be ready for use on the particular job without the necessity of laborious setting up of the tool unit and testing by trial and error each time the job is set up.

Another advantage is in the use of my invention in cutting tools of the inserted tooth type, particularly in milling cutters. Here a series of cutter units may be mounted in circumferentially spaced relation on a supporting body and the individual cutter units may be preset to a given standard before mounting on the supporting body, as will be apparent from the above description.

It will be apparent, therefore, to those skilled in this art, that the use of my invention is particularly desirable in the presetting of tools for many different boring, turning, and milling operations. Its use not only serves to accomplish material time saving in the setting and resetting of cutting tools, but it also promotes economy in tool equipment. An example of this will be apparent from the foregoing description wherein a saving is effected in the number of boring bars or other cutter unit supports required for a large range of operations.

I claim:

1. A setting block for pre-setting the cutter element of a cutter unit of the type having a cutter-carrying body with a dial member threaded thereon, which dial member is provided with measurement graduations and an abutment surface together with means for locking the dial member to the cutter-carrying body, which comprises a solid member defining said block including means defining a bore in said setting block having means defining a seating surface engageable with the abutment surface of said dial member accurately to position said cutter unit in said bore with respect to said setting block, means providing a set of measurement graduations on said block cooperative with the measurement graduations on said dial member, and means defining an access slot in said block to provide access to said locking means for a hand tool when said cutter unit is in said bore for operating the same to lock or unlock said dial member with respect to said cutter-carrying body, whereby said dial member may be adjusted on said seating surface by rotative movement about the cutter-carrying member and in coaction with said measurement graduations to set the cutter element with respect to said seating surface, application of said hand tool causing subsequent locking of said dial member to said cutter-carrying body in such adjusted position.

2. The arrangement defined in claim 1 wherein the bottom of the block is provided with a flat base surface from which measurements may be taken, a second flat base surface in angular relation to the first mentioned base surface and serving for taking measurements, said block having another set of measurement graduations coacting with the dial member, one of said sets being graduated to a given scale for dial adjustment when the block is supported on its first mentioned base surface and the other of said sets being graduated to a different scale for dial adjustments when the block is supported on the second base surface.

3. A setting block for pre-setting the tool element of a cutter unit wherein said pre-setting is effected by adjustment of a measurement graduated dial member on the cutter-carrying member of the cutter unit and by locking said dial member to said cutter-carrying member through means of a lock nut on the latter member acting against the dial member, comprising means on said block shaped to receive the cutter unit including a supporting surface for accurately positioning said dial member when the cutter unit is supported on said block, said block having measurement graduations coacting with those on the dial member when the latter is seated on said surface, and a lateral slot in said block affording access for a hand tool to engage said lock nut for locking said lock nut when the dial member is seated on said block.

4. A setting block for pre-setting the cutter element of a cutter unit of the type having a cutter-carrying body with a dial member threaded thereon and a locking member for locking the dial member to the cutter-carrying body, comprising means defining a flat base surface from which surface measurements may be taken, a bore to receive the cutter unit, a seating surface upon which the dial member of the cutter unit is adapted to be seated accurately to support the cutter with its longitudinal center axis perpendicular to the plane of said base, means coacting between the cutter unit and the block to prevent rotative movement of the cutter unit with respect to the block when the cutter unit is seated thereon, said locking member being located interiorly of the block with relation to said seating surface, means defining a lateral opening in said block for access of a hand tool to said locking member for operating the same to lock or unlock said dial member with respect to said cutter-carrying body, whereby said dial member may be adjusted on said seating surface to adjust the cutter element with respect to said seating surface and said dial member may be subsequently locked to the cutter-carrying body in such adjusted position by operation of said hand tool.

5. The arrangement defined in claim 4 wherein the base of the block is provided with a second flat base surface in angular relation to the first mentioned base surface and serving for taking measurements, and the block having two sets of graduations coacting with the dial member, one set being graduated to a given scale for dial adjustment when the block is supported on its first mentioned base surface and the other set being graduated to a different scale for dial adjustments when the block is supported on the second base surface.

6. A setting block for pre-setting the tool element of a cutter unit supported thereon whereby said pre-setting is effected by adjustment of a graduated dial on the cutter-carrying member of the cutter unit, comprising means defining a first flat base surface and a second flat base surface in angular relation to the first base surface, a seating surface on the block on which the cutter unit is adapted to be seated with the longitudinal axis of the cutter unit perpendicular to the first base surface, and the block having two sets of graduations coacting with the adjustable dial one set being graduated to a given scale for dial adjustments when the block is supported on its first mentioned base surface and the other set being graduated to a different scale for dial adjustments when the block is supported on the second base surface.

7. For use in pre-setting a cutting unit characterized by a cutter-carrying body having a graduated dial adjusting member threaded thereon for adjustment axially with respect thereto and means for locking said dial member in selected adjusted positions on said cutter-carrying body, the combination of a setting block having a seating surface on which said dial member is adapted to be seated accurately to support the cutting unit in a position identically simulating a predetermined position of the cutting unit in a tool body, means on the setting block coacting with the cutter-carrying body to retain it against rotative movement with respect to the block, said dial member being rotatable on said seating surface to make minute accurate axial adjustments of the cutter-carrying body with respect to the block, and means affording access for a hand tool to engage said locking means when said dial member is on said seating surface.

8. For use with a cutting unit characterized by a cutter-carrying body having a graduated dial adjusting member threaded thereon for adjustment axially with respect thereto including locking means for locking said dial member to said cutter-carrying body and wherein said dial member has a conical base surface, the combination of a setting block having a conical seating surface on which the conical base surface of the dial member is seated accurately to support the cutting unit in a position identically simulating a predetermined position of the cutting unit in a tool body, means on the setting block coacting with the cutter-carrying body to retain it against rotative movement with respect to said block, said dial member being rotatable on said seating surface to make minute accurate axial adjustments of the cutter-carrying body with respect to the block, and said block having means affording access to said locking means when said dial member engages said conical seating surface.

HOWARD R. DE VLIEG.

References Cited in the file of this patent

UNITED STATES PATENTS

| Number | Name | Date |
| --- | --- | --- |
| 1,109,952 | Armstrong | Sept. 8, 1914 |
| 1,284,456 | Richards et al. | Nov. 12, 1918 |
| 1,336,311 | Martin | Apr. 6, 1920 |
| 1,407,833 | Blood | Feb. 28, 1922 |
| 1,415,339 | Hall | May 9, 1922 |
| 1,435,428 | Stromgren | Nov. 14, 1922 |
| 1,513,024 | Baumann et al. | Oct. 28, 1924 |
| 1,668,431 | Sprinkle | May 1, 1928 |
| 1,860,174 | Cronk | May 24, 1932 |
| 2,000,476 | Schmidt | May 7, 1935 |
| 2,043,614 | Hahe | June 9, 1936 |
| 2,316,591 | Johnson | Apr. 13, 1943 |
| 2,330,692 | DeVlieg | Sept. 28, 1943 |
| 2,348,116 | Dzus | May 2, 1944 |
| 2,537,517 | DeVlieg | Jan. 9, 1951 |

FOREIGN PATENTS

| Number | Country | Date |
| --- | --- | --- |
| 533,514 | France | Mar. 4, 1922 |